United States Patent [19]

Dudley et al.

[11] Patent Number: 4,611,297
[45] Date of Patent: Sep. 9, 1986

[54] BUS GRANT CIRCUIT

[75] Inventors: Catherine M. Dudley; Thomas A. Remedios, both of San Jose, Calif.

[73] Assignee: Pitney Bowes Inc., Stamford, Conn.

[21] Appl. No.: 524,270

[22] Filed: Aug. 18, 1983

[51] Int. Cl.[4] .......................................... G06F 13/14
[52] U.S. Cl. ................................................. 364/900
[58] Field of Search ............... 307/514, 527, 528, 234; 364/200 MS File, 900 MS File

[56] References Cited

U.S. PATENT DOCUMENTS

| | | | |
|---|---|---|---|
| 4,275,440 | 6/1981 | Adams, Jr. et al. | 364/200 |
| 4,365,294 | 12/1982 | Stokken et al. | 364/200 |
| 4,415,972 | 11/1983 | Adcock | 364/200 |
| 4,454,581 | 6/1984 | Nystrom | 364/200 |
| 4,471,425 | 9/1984 | Yamaguchi et al. | 364/200 |
| 4,539,656 | 9/1985 | Abrant | 364/900 |

OTHER PUBLICATIONS

"High Speed Bus Arbiter for Bus-Oriented Multiprocessor Systems", IBM Technical Disclosure Bulletin, vol. 28, No. 2, 7/85, pp. 567–569.

Primary Examiner—James D. Thomas
Assistant Examiner—Thomas Lee
Attorney, Agent, or Firm—Robert H. Whisker; David E. Pitchenik; William D. Soltow, Jr.

[57] ABSTRACT

A bus grant circuit for controlling access by a digital device connected to a common bi-directional bus and a bus arbitration system incorporating such circuit. The bus arbitration system comprises a common bus request, a common bus busy line, a bus grant line daisy-chained through each device which may request bus control and a bus arbitrator which asserts a signal on the bus grant line in response to a bus request signal and the absence of a bus busy. Each device which may request bus control includes an associated bus grant circuit comprising a first flip-flop responsive to the input of the bus grant signal and to an internal bus request signal from the associated device to set when the bus grant signal is asserted and the internal bus request signal is not asserted, allowing the bus grant signal to be passed on, a second flip-flop responsive to the input of the bus grant signal and to the internal bus request signal to set when the bus grant signal and the internal bus request signal are asserted, allowing the associated device to the control of the bus, and associated logic for preventing both circuits from being set simultaneously.

19 Claims, 4 Drawing Figures

BUS GRANT CIRCUIT

BACKGROUND OF THE INVENTION

It is well known in the digital systems art to design general purpose computers and other types of digital systems using a common bus structure having bi-directional address, data and control lines. (A bi-directional line is a single line which a given device may use to either transmit or receive a particular signal). A typical such system is shown in FIG. 1 and consists of a central processing unit (CPU) 10, a random access memory (RAM) 20, a disk controller 30 and a communications controller 40. Each of these devices, except for RAM 20, has the capability to read or write data to or from any addressable location connected to bus 50 by asserting the address of a location on address lines 52, executing a read or a write sequence using control lines 54 and, as appropriate, either asserting data to be written or reading data from, data lines 56. The RAM 20 contains the bulk of the addressable locations in the system. However, it should be noted that controllers 30 and 40 and even in principle, CPU 10 may contain storage locations which are addressable from bus 50.

In systems having such a bus, it is necessary to have some technique for avoiding errors caused by two units attempting to transfer data on the bus simultaneously. In order to avoid such errors, bus structures include bus arbitration circuitry which establishes priorities for granting requests for control of the bus and grants control of the bus to the requesting unit having the highest priority.

A common technique for bus arbitration is shown in FIG. 2 and includes a bi-direction bus busy signal (BBSY), a bus request signal (BRQ) and a bus grant signal (BG) which is "daisy-chained" through the bus arbitration logic of each unit which is capable of gaining control of the bus. (By "daisy-chained" herein is meant that the signal flows undirectionally and sequentially through each of the units which is capable of gaining control of the bus. Within each unit, the signal flows through arbitration logic which allows the signal to pass on to the next unit only if the unit passing on the signal is not requesting control of the bus.)

FIG. 2 shows a block diagram of a typical bus arbitration scheme used in a digital system such as that described above. Bus arbitrator 110 receives BRQ on BRQ line 116. Line 116 is a control line common to all units which may take control of the bus and typically is driven by open collector circuits to ground and a pull-up resistor to a plus voltage. BRQ is asserted at a low level by one or more units driving line 116 low. When arbitrator 110 sees BBSY on control line 114 indicate that the bus is no longer busy, it asserts BG on control line 1112.

As described above, this signal is daisy-chained through each unit, except RAM 20 which is a passive device not capable of assuming control of bus 50. The first unit to receive BG which is asserting BRQ may then assert BBSY and take control of bus 50. By not passing on BG that unit prevents any other unit which is electrically further from arbitrator 110 from gaining control of bus 50. Thus units are given priority of access to bus 50 in the order in which they are connected to the BG daisy-chain.

Such bus arbitration techniques are well known to those skilled in the art, however, heretofore they have suffered from a problem arising from the asynchronous nature of the various units connected to the common bus. Because of the asynchronous type of operation typical of units requesting control of the common bus, it is possible for such a unit to request control of the common bus at any time; in particular, in the prior art, it was possible for a higher priority unit to pass on BG and then assert BRQ before a lower priority unit which had originally asserted BRQ, would have had time to assert BBSY and take control of the common bus. Under these circumstances, it was possible for two units to attempt to control the common bus at the same time, generally resulting in a fatal system error.

Thus it is an object of the subject invention to provide an improved bus arbitration system of the type described which substantially reduces the probability of two units simultaneously obtaining control of the bus.

It is a further object of the subject invention to provide a bus arbitration circuit for use in such an improved bus arbitration system which is associated with a unit in a system such as that described above which will either pass along a bus grant signal or will assert control of the bus but which will not simultaneously do both.

It is another object of the subject invention to provide such a circuit which may be incorporated into such a system without change to existing bus protocols.

BRIEF SUMMARY OF THE INVENTION

The disadvantages of the prior art are overcome and the above objects are achieved by a bus arbitration system in accordance with the subject invention which comprises a plurality of digital devices connected to a bi-directional digital communications bus, the bus having control lines including a bi-directional bus request line upon which any of said devices may assert a signal to request control of the bus, a bi-directional bus busy line upon which any of said devices may assert a signal indicating that that device has control of the bus, and bus grant in and bus grant out lines which are used to sequentially pass a bus grant signal through each of said devices. The system also includes a bus arbitrator for initially generating a bus grant signal in response to the assertion of the bus request signal and the absence of the bus busy signal.

A digital circuit is operatively associated with the digital devices and further comprises a first flip-flop responsive to the input of the bus grant signal and to an internal bus request signal generated by the associated digital device to set when said bus grant signal is asserted if the internal bus request signal is not asserted, a second flip-flop circuit responsive to the input of the bus grant signal to set when the bus grant signal is asserted if the internal bus request signal is asserted, and logic associated with the flip-flop circuits to prevent both flip-flop circuits from being set simultaneously. The output of the first flip-flop circuit enables the bus grant output so that the bus grant signal is passed on and the output of the second flip-flop circuit asserts the busy signal and enables the associated device to take control of the bus.

Since the associated logic prevents both flip-flops from being set simultaneously, the circuit prevents the associated device from taking control of the bus after the bus grant signal is passed on.

It will be apparent to those skilled in the art that the subject invention achieves the objects set forth above while advantageously minimizing the delay in propagating the bus grant signal. Other objects and advantages of the subject invention will be apparent to those skilled in the art from consideration of the attached drawings and the detailed description set forth below.

DETAILED DESCRIPTION OF A PREFERRED EMBODIMENT

The following conventions apply to FIGS. 3 and 4 and to the detailed description set forth below.

(a) logic elements are depicted in accordance with Military Standard 806C;

(b) inputs and outputs shown as circled are asserted or active at a low voltage level;

(c) signals whose names have a * suffix are asserted at a low voltage level;

(d) a bar over a signal name indicates the non-asserted state;

(e) inputs not shown are permanently wired to be inactive;

(f) flip-flops are positive edge triggered "D" type, with overriding preset and clear inputs;

(g) BGIN* and BGO* are bus grant in and bus grant out signals, respectively;

(h) BRQ* is a common, bi-directional bus request signal on the bus;

(i) BBSY* is a common bi-directional bus busy signal on the bus;

(j) CBRQ* is an internal bus request signal asserted when a device requests control of the bus and removed when the device gains control of the bus;

(k) OWNB* is an internal signal asserted when a device gains control of the bus and removed when the device releases the bus;

(l) time internals are each arbitrary and are shown as uniform for ease of illustration only.

Figure 1:
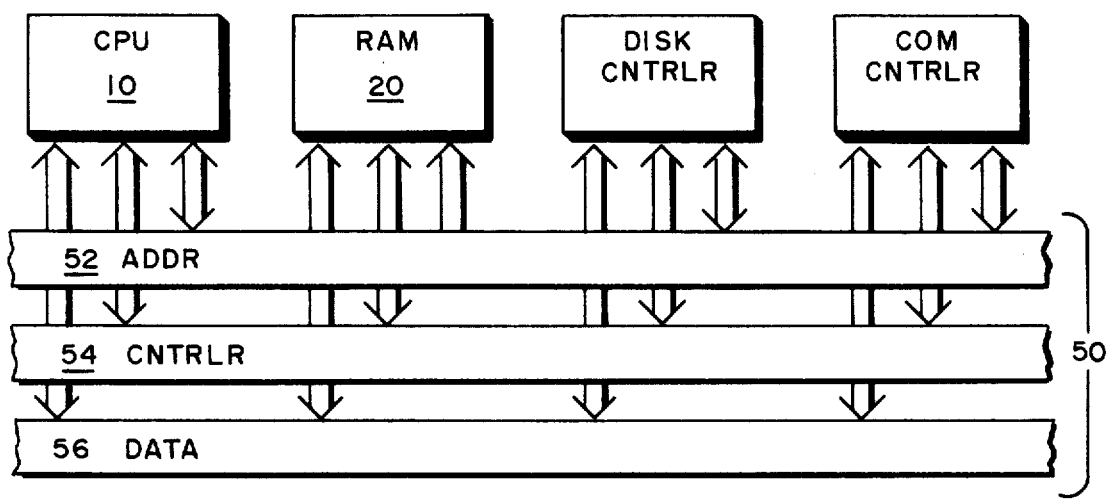
FIG. 1 is a schematic block diagram of a prior art digital system having a bi-directional communications bus.
Figure 2:
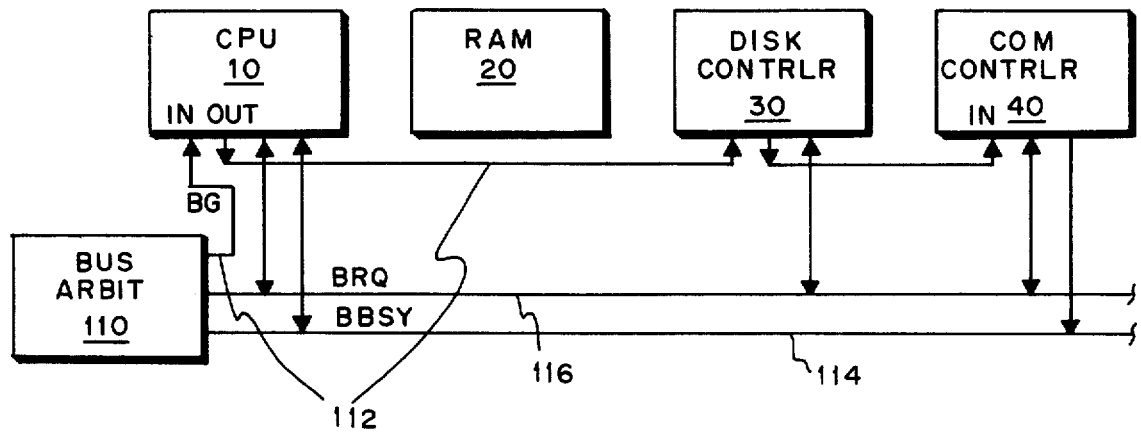
FIG. 2 is a schematic block diagram of a prior art bus arbitration system.
Figure 3:
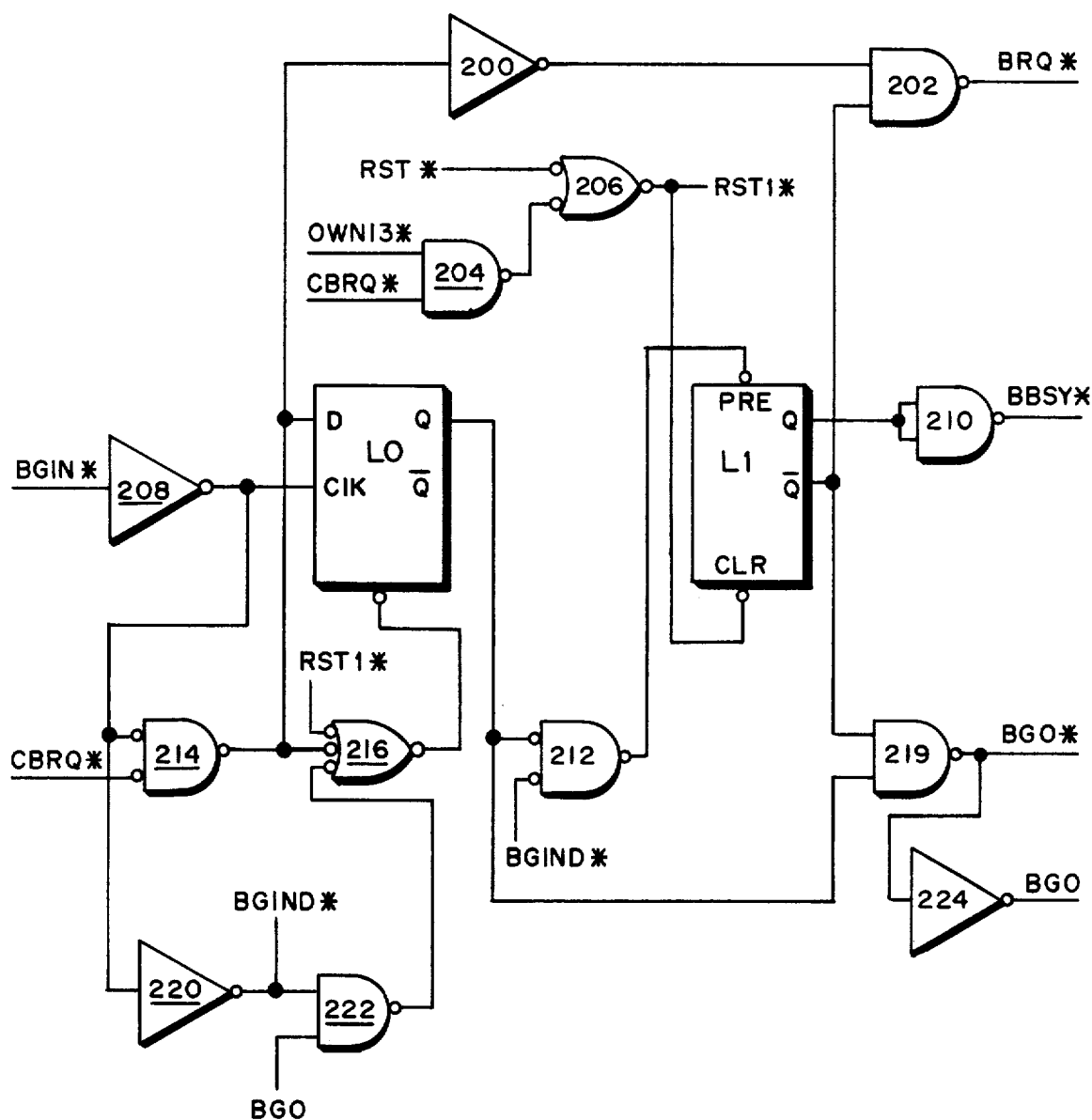
FIG. 3 is a schematic logic diagram of a bus arbitration circuit in accordance with the subject invention.
Figure 4:
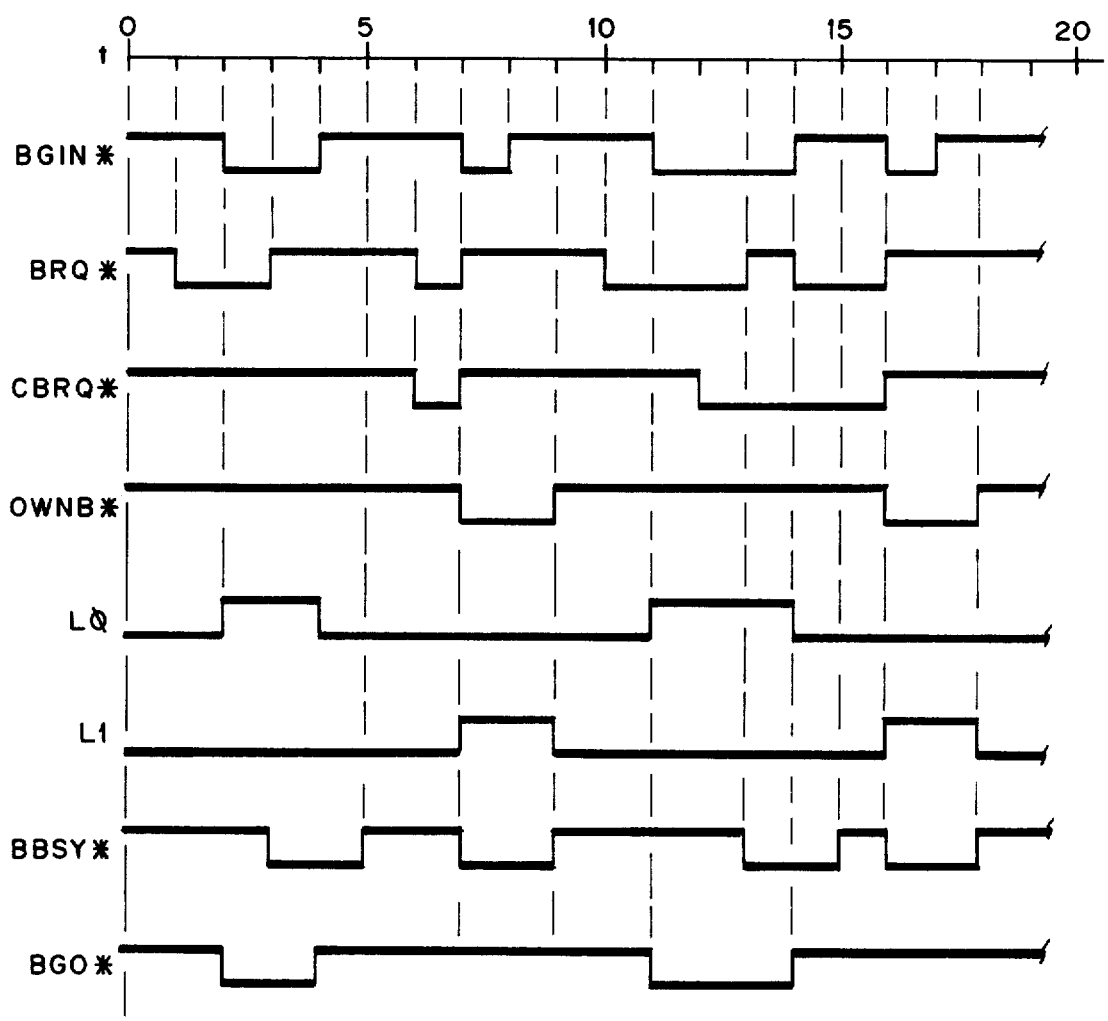
FIG. 4 is a timing diagram of the circuit of FIG. 3.

Turning to FIGS. 3 and 4, the digital circuit of the subject invention comprises two flip-flop circuits; flip-flop L0 and the logic defining its inputs, and flip-flop L1 and the logic defining its inputs, and additional output gating to the bus. At time t0, all bus and internal signals are not asserted and flip-flops L0 and L1 are reset. (Note that L0 and L1 may be initially cleared by RST* generating RST1* through OR gate 206.)

The embodiment shown will be described with respect to the following conditions:

(A) another device of lower priority requests control of the bus and the device associated with the illustrated circuit does not request control of the bus;

(t1) another device, of lower priority, asserts BRQ*;

(t2) a bus arbitrator responds to BRQ* and BBSY* and asserts BGIN*. L0 responds to BGIN* and CBRQ* through invertor 208 and AND gate 214 and sets. L0 holds the output of AND gate 212 high and L1 does not set. L0 and $\bar{L1}$ assert BGO* through AND gate 214;

(t3) the other device responds to BGO* and asserts BBSY* and releases BRQ*;

(t4) the bus arbitration responds to BBSY* and removes BGIN*. L0 responds to BGINB* and BGO through inverters 208 and 220, AND gate 222 and OR gate 216 and resets, removing BGO*;

(t5) the other device releases BBSY*, restoring initial ditions;

(B) The associated device requests control of the bus and no other device requests control;

(t6) the associated device asserts CBRQ* AND gate 202 responds to BGIN*, CBRQ* and L1 through invertors 208 and 200, and AND gate 214 to assert BRQ*;

(t7) the bus arbitrator asserts BGIN*. L1 responds to BGINB* and L0 through AND gate 212 and sets, asserting BBSY* and releasing BRQ*. (Note that if a higher priority device requests control of the bus before BGIN* is received, CBRQ* and BRQ* will remain asserted until the higher priority device passes on a BGIN*.) The associated device removes CBRQ* and asserts OWNB*;

(t8) the bus arbitrator responds to BBSY* and removes BGIN*;

(t9) the associated device removes OWNB* when it is through with the bus. L1 responds to CBRQ* and OWNB* through AND gate 204 and OR gate 206 and resets, releasing BBSY* and restoring initial conditions;

(C) The associated device requests control of the device after BGO* is asserted but before the lower priority device asserts BBSY*;

(t10) the lower priority device asserts BRQ*;

(t11) the bus arbitrator asserts BGIN*. L0 sets and BGO* is asserted as at time t2;

(t12) the associated device asserts CBRQ* before the lower priority device can respond to BGO*. Because BGIN* is the "D" input to L0, the input is held high through invertor 208 and AND gate 214 and L0 remains set, L1 reset;

(t13) the other device asserts BBSY* and releases BRQ*;

(t14) the bus arbitrator responds to BBSY* and removes BGIN*. L0 and BGO* reset as at time +4. AND gate 202 responds to BGIN* CBRQ* and L1 through invertors 200 and 208 and AND gate 214 and asserts BRQ*;

(t15) the lower priority device releases BBSY*;

(t16) the bus arbitrator responds to BBSY* and asserts BGIN*. L1 sets, asserting BBSY* and releasing BRQ*, and the associated device removes CBRQ* and asserts OWNB*, as at time t7;

(t17) the associated device removes OWNB* when it is through with the bus resetting L1 and releasing BBSY* as at time t9; restoring the initial conditions.

The embodiment of the subject invention described above and shown in the attached drawings are given by way of illustration only. Other embodiments of the subject invention will be apparent to those skilled in the art upon consideration of the present teaching. Accordingly, limitations on the scope of the subject invention are to be found only in the claims set forth below.

What is claimed is:

1. A bus arbitration system comprising:
   (a) a plurality of digital devices connected to a digital communications bus, said bus including a plurality of control lines, said control lines further comprising:
      (a1) a bus request line upon which a device may assert an asyncronous bus request signal to request control of the bus;
      (a2) a bus busy line upon which a device may assert a bus busy signal to indicate that that device has control of said bus;

(a3) bus grant in and bus grant out lines which are used to sequentially pass a bus grant signal through each of said device;

(b) means for initially generating said bus grant signal in response to the assertion of said bus request signal and the absence of said bus busy signal;

(c) a digital circuit connected to one of said digital devices, said digital circuit further comprising:

(c1) a first flip-flop circuit responding to the input of said bus grant signal and to an internal bus request signal generated by said connected digital device to set when said bus grant signal is asserted if said internal bus request signal is not asserted and to reset when said bus grant signal is removed, the set state of said first flip-flop circuit enabling said bus grant signal to be passed to the next of said plurality of digital devices;

(c2) a second flip-flop circuit responding to the input of said bus grant signal and to said internal bus request signal to set when said bus grant signal is asserted; if said internal bus request signal is asserted, the set state of said second flip-flop circuit causing a signal to be asserted on said bus busy line and enabling said connected device to take control of said bus, said second flip-flop circuit also responding to signals from said connected device to reset and remove said bus busy signal when said associated device releases said bus; and (c3) logic circuitry means controlled by the output states of said flip-flop circuits for generating signals to said flip-flop circuits respectively to prevent both of said circuits from being set simultaneously.

2. A bus arbitration system as described in claim 1 wherein said bus request line and said bus busy line are bi-directional lines common to each of said plurality of devices and upon which any of said devices may assert a signal.

3. A bus arbitration system as described in claim 1 wherein said bus is a bi-directional bus.

4. A bus arbitration system as described in claim 1 wherein said digital circuit generates a bus grant output signal, said output signal being logically equal to the AND combination of the set state of said first flip-flop circuit and the reset state of said second flip-flop circuit.

5. A bus arbitration system as described in claim 2 wherein said digital circuit generates a bus grant output signal, said output signal being logically equal to the AND combination of the set state of said first flip-flop circuit and the reset state of said second flip-flop circuit.

6. A bus arbitration system as described in claim 1 wherein said digital circuit generates said bus request signal and said bus busy signal, said bus request signal being logically equal to the AND combination of the reset state of said second flip-flop circuit, the assertion of said internal bus request signal and the absence of said bus grant signal input, and said bus busy signal is logically equal to the set state of said second flip-flop circuit.

7. A bus arbitration system as described in claim 2 wherein said digital circuit generates said bus request signal and said bus busy signal, said bus request signal being logically equal to the AND combination of the reset state of said second flip-flop circuit, the assertion of said internal bus request signal and the absence of said bus grant signal input, and said bus busy signal is logically equal to the set state of said second flip-flop circuit.

8. A digital circuit for use in a bus arbitration system for granting control of a digital communications bus to one of a plurality of digital devices connected to said bus, one of said devices being connected to said digital circuit, of the type wherein a bus grant signal is propagated sequentially through said digital devices so that each of said digital devices not requesting control of said bus passes on said bus grant signal to the next of said digital devices and so that the first of said digital devices requesting control of said bus to receive said bus grant assumes control of said bus and does not pass on said bus grant signal, said circuit comprising:

(a) a first flip-flop circuit responding to an internal bus request signal asynchronously generated by the one of said digital devices connected to said circuit and to the input of said bus grant signal to set on the leading edge of the assertion of said bus grant signal input if and only if said internal bus request signal is not asserted, said set state of said first flip-flop circuit enabling said digital device to pass along said bus grant signal, and said first flip-flop circuit responding to the trailing edge of the assertion of said bus grant signal to reset said flip-flop circuit; and, (b) a second flip-flop circuit responding to said request signal, said bus grant signal and to the state of said first flip-flop circuit to set said second flip-flop circuit if and only if said bus request signal is asserted, said bus grant signal input is received and said first flip-flop is not set, said set state of said second flip-flop circuit enabling said connected digital device to assert a bus busy signal and assume control of said bus, and said second flip-flop responding to a signal from said connected device to reset when said connected device to pass on said bus grant signal or to assert said bus busy signal without inadvertent erroneous simultaneous assertion of said bus busy signal and said bus grant signal output by said connected digital device.

9. A circuit as described in claim 8 wherein said first flip-flop circuit further comprises an edge sensitive "D" type flip-flop the "D" input of said flip-flop being conditioned to set by the absence of said internal bus request signal and the clock input of said flip-flop being triggered by the leading edge of the input of said bus grant signal.

10. A circuit as described in claim 8 wherein said digital circuit generates a bus output signal, said output signal being logically equal to the AND combination of the set state of the first flip-flop circuit and the reset state of the second flip-flop circuit.

11. A circuit as described in claim 9 wherein said digital circuit generates a bus output signal, said output signal being logically equal to the AND combination of the set state of the first flip-flop circuit and the reset state of the second flip-flop circuit.

12. A circuit as described in claim 8 wherein said circuit generates said bus request signal and said bus busy signal, said bus request signal being logically equal to the AND combination of the reset state of said second flip-flop circuit, the assertion of said internal bus request signal and the absence of said bus grant signal input, and said bus busy signal is logically equivalent to the set state of said second flip-flop circuit.

13. A circuit as described in claim 9 wherein said circuit generates said bus request signal and said bus busy signal, said bus request signal being logically equal to the AND combination of the reset state of said second flip-flop circuit, the assertion of said internal bus request signal and the absence of said bus grant signal input, and said bus busy signal is logically equivalent to the set state of said second flip-flop circuit.

14. A digital circuit, connected to one of a plurality of digital devices connected to a digital communications bus, for use in a bus arbitration system for granting control of said bus to one of said systems, said circuit comprising:
   (a) a first flip-flop circuit responding to a bus request signal asyncronously generated by said connected digital device and to a bus grant signal sequentially propagated through said plurality of devices to set when said bus grant signal is asserted if said bus request signal is not asserted and to reset when said bus grant signal is removed, the set state of said first flip-flop enabling said bus grant signal to be passed on the next of said plurality of devices;
   (b) a second flip-flop circuit responding to said bus request signal and said bus grant signal to set when said bus grant signal is asserted if said bus request signal is asserted, the set state of said second flip-flop circuit causing a bus busy signal to be asserted on said bus and allowing said association device to take control of said bus, said second flip-flop also responding to signals from said associated device to reset and remove said bus busy signal when said connected device releases said bus; and,
   (c) logic circuitry means controlled by the output states of said flip-flop circuits for generating signals to said flip-flop circuits respectively to prevent both of said circuits from setting simultaneously.

15. A circuit as described in claim 14 wherein said first flip-flop circuit further comprises an edge sensitive "D" type flip-flop the "D" input of said flip-flop being conditioned to set by the absence of said internal bus request signal and the clock input of said flip-flop being triggered by the leading edge of the input of said bus grant signal.

16. A circuit as described in claim 14 wherein said digital circuit generates a bus grant output signal, said output signal being logically equal to the AND combination of the set state of the first flip-flop circuit and the reset state of the second flip-flop circuit.

17. A circuit as described in claim 15 wherein said digital circuit generates a bus grant output signal, said output signal being logically equal to the AND combination of the set state of the first flip-flop circuit and the reset state of the second flip-flop circuit.

18. A circuit as described in claim 14 wherein said circuit generates said bus request signal and said bus busy signal, said bus request signal being logically equal to the AND combination of the reset state of said second flip-flop circuit, the assertion of said internal bus request signal and the absence of said bus grant signal input, and said bus busy signal is logically equivalent to the set state of said second flip-flop circuit.

19. A circuit as described in claim 15 wherein said circuit generates said bus request signal and said bus busy signal, said bus request signal being logically equal to the AND combination of the reset state of said second flip-flop circuit, the assertion of said internal bus request signal and the absence of said bus grant signal input, and said bus busy signal is logically equivalent to the set state of said second flip-flop circuit.

* * * * *